US005764818A

United States Patent [19]
Capps et al.

[11] Patent Number: 5,764,818
[45] Date of Patent: Jun. 9, 1998

[54] METHOD FOR LOCATING AND DISPLAYING INFORMATION IN A POINTER-BASED COMPUTER SYSTEM

[75] Inventors: Stephen P. Capps, San Carlos; John R. Meier, Cupertino, both of Calif.

[73] Assignee: Apple Computer, Inc., Cupertino, Calif.

[21] Appl. No.: 1,121

[22] Filed: Jan. 5, 1993

Related U.S. Application Data

[63] Continuation-in-part of Ser. No. 889,660, May 27, 1992, Pat. No. 5,710,844.

[51] Int. Cl.$^6$ .................................................. G06K 9/20
[52] U.S. Cl. .................................................. 382/317
[58] Field of Search .................................. 382/100, 229, 382/282, 309, 317; 395/144, 145, 146, 148, 934

[56] References Cited

U.S. PATENT DOCUMENTS

| 4,542,378 | 9/1985 | Suganuma et al. | 382/61 |
|---|---|---|---|
| 4,553,261 | 11/1985 | Froessl | 382/61 |
| 5,165,012 | 11/1992 | Crandall et al. | 395/144 |
| 5,172,245 | 12/1992 | Kita et al. | 382/61 |
| 5,179,652 | 1/1993 | Rozmanith et al. | 395/148 |

OTHER PUBLICATIONS

O'Connor, Rory J., "Apple banking on Newton's brain," San Jose Mercury News, Apr. 22, 1992.
Weiman et al, "A Step Toward the Future" Macword, Aug. 1992, p. 129.
M. Soviero, "Your World According to Newton" Popular Science, Sep. 1992.
F. Abatemarco, "From the Editor" Popular Science, Sep. 1992, p. 4.

Primary Examiner—Jose L. Couso
Attorney, Agent, or Firm—Beyer & Weaver, LLP

[57] ABSTRACT

A user interface is disclosed that facilitates easy find and display operations that search through the memory of a pointer based computing system. The user interface includes searching methods that are particularly well suited for use in a computer system in which the contents of the memory are divided into a plurality of searchable application files that are each capable of containing a plurality of records. In one aspect of the invention an improved find dialog box is disclosed. In another aspect, a method of selecting local verses global searches together with a method of conducting the chosen search and processing user inputs in response to the search results is disclosed. Additionally, an improved interface for displaying the results of various searches is described.

35 Claims, 15 Drawing Sheets

METHOD FOR LOCATING AND DISPLAYING INFORMATION IN A POINTER-BASED COMPUTER SYSTEM

This application is a Continuation-in-part of application Ser. No. 07/889,660 filed May 27, 1992 now U.S. Pat. No. 5,710,844, which is incorporated herein by reference.

BACKGROUND OF THE INVENTION

The present invention relates generally to searching for information in a computer data base and displaying the search result. More particularly, a user interface particularly suited for searching the memory in a pointer based computer systems disclosed.

The use and popularity of pointer and pen based computer systems, including pen-based, stylus-based, track ball, and mouse driven systems has been increasing dramatically in recent years. This increased popularity is typically attributed to the ease of use of such machines, when compared to traditional computing systems that utilize only a keyboard as an input device.

A pen-based computer system is a small, often hand held, computer system in which the primary method for inputting data includes a stylus or "pen". A typical pen-based computer system is housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of the stylus on the viewing screen and provides positional information to the computer's central processing unit (CPU). Some display assemblies can also sense the pressure of the stylus on the screen to provide further information to the CPU. When operating as an output device, the display assembly presents computer-generated images on the screen.

The dual-function display assembly of a pen-based computer system permits users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen. With suitable recognition software, text and numeric information can also be entered into the penbased computer system in a similar fashion.

Besides serving as a notepad, pen-based computers can provide a number of useful functions, such as serving as an address book, an appointment calendar, a to-do list, etc. These functions can be tightly integrated with the operating system of the computer, permitting information input into one function to impact upon another function.

Users of pointer and pen based computer systems often want to be able to find and display information stored in memory even though they may not remember the exact file that the information is stored in and/or the file location. It is therefore desirable that a technique be available for searching the memory of such systems and for displaying the results of that search in formats useful to the user.

SUMMARY OF THE INVENTION

Accordingly, it is an object of the present invention to provide a searching method and user interface which is particularly well suited for use in pointer based computer systems.

To achieve the foregoing and other objects and in accordance with the purpose of the present invention, a method for searching the contents of memory associated with a computer system and displaying the search results on a display screen associated with the computer system is disclosed. The method is particularly well suited for use in a system in which the contents of the memory include a plurality of searchable application files that are each capable of containing a plurality of records. In one preferred aspect of the invention the method includes the steps of receiving a find command from a user and displaying a find dialog box on the display screen in response to the find command. A search string selection is then received and displayed in the find dialog box. At some point a determination is made as to whether the user desires to utilize a global search mode or a local search mode and thereafter, the desired search using the selected search string is executed. When the local search mode is selected, a search is made through the particular application file that is currently active. When the global search mode is selected, a search is made through each of the searchable application files and a list is made of the application files searched and the number of records within each application file that contain the search string. After the search has been executed, at least a portion of the search results are displayed and any subsequent user inputs are processed.

In a second preferred aspect of the invention, the results displayed after a global search include a summary indicating each of the application files in which the search string was found and an indication of the number of records within each such application file that include the search string.

In a third preferred aspect of the invention, a find dialog box is displayed on the display screen after the find command is received. The find dialog box has a global search icon displayed therein and also displays the search string when it is received. A determination as to whether to conduct a global search or a local search is then made based on whether the global icon is selected or not. The global icon can be selected and unselected by sequentially clicking thereon using a pointing device.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

The present invention is particularly well suited for pointer based computer systems such as the pen-based, stylus-based and mouse-based systems that are currently popular. For the purposes of illustration, the invention will be described in connection with a pen-based system.

Figure 1:
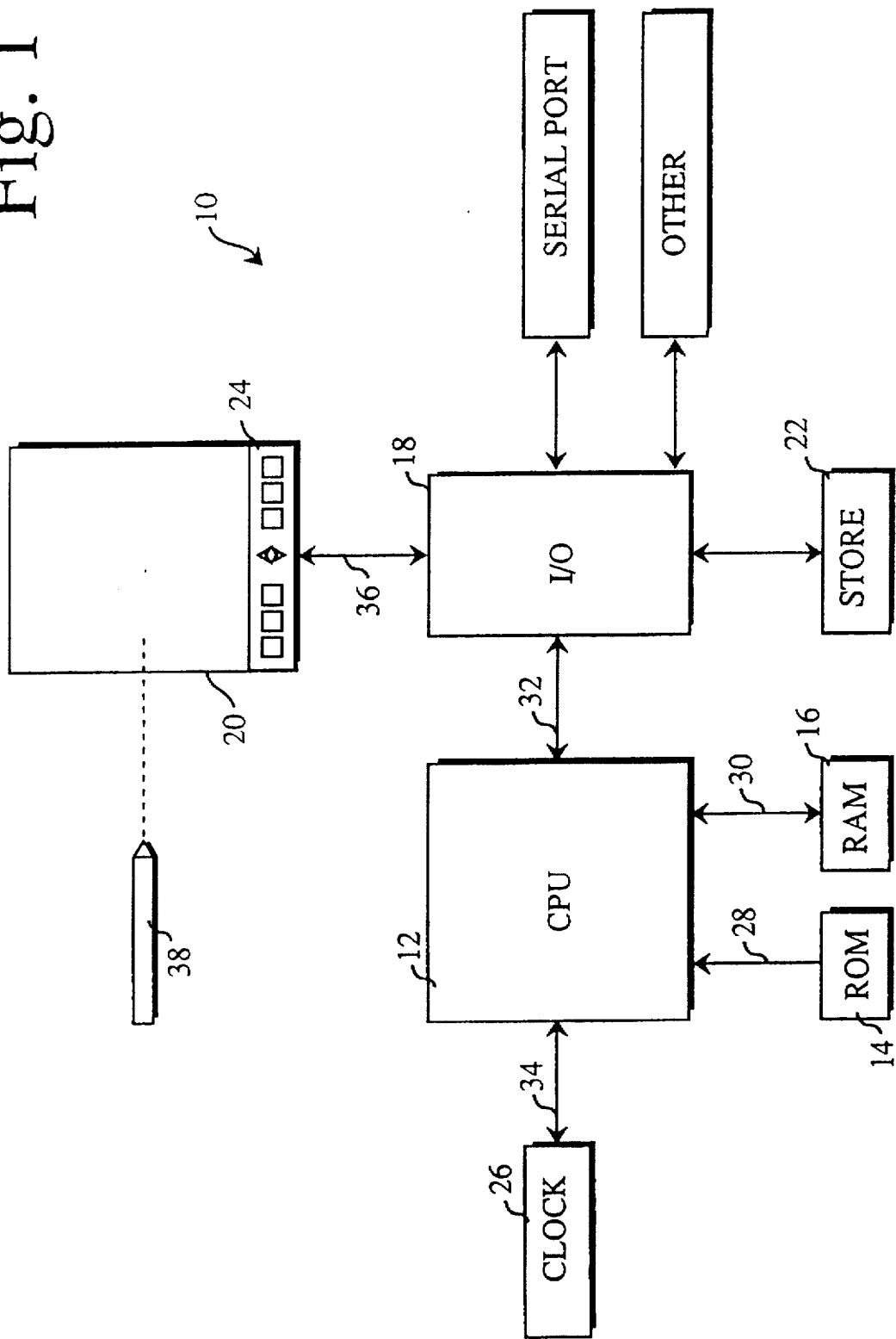
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or nonvolatile memory such as flash memory, a keypad 24 arranged as an array of input buttons, a serial port, another I/O port and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bidirectional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bidirectional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, the keypad 24, a serial port and an I/O port. Keypad 24, the serial port, and the I/O port are each coupled to the I/O circuitry 18 by a suitable data bus.

Clock 26 provides a series of clock pulses and is typically coupled to an interrupt port of CPU 12 by the data line 34. The clock pulses are used to time various functions and events relating to the computer system 10. The clock 26 can be eliminated and the clock function replace by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position sensitive membranes are also readily available on the commercial market. Combination display assemblies such as display assembly 20 which include both the LCD and the input membrane are commercially available from such vendors as Scriptel Corporation of Columbus, Ohio.

The keypad 24 can comprise an array of switches. In the present embodiment, the keypad 24 comprises mechanical buttons which overlie the bottom edge of the membrane which covers the LCD display. When the buttons are depressed, the membrane senses the pressure and communicates that fact to the CPU 12 via I/O circuitry 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, or nonvolatile memory such as flash memory or battery backed RAM, PC-data cards or the like.

In operation, information is input into the pen-based computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. X & Y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
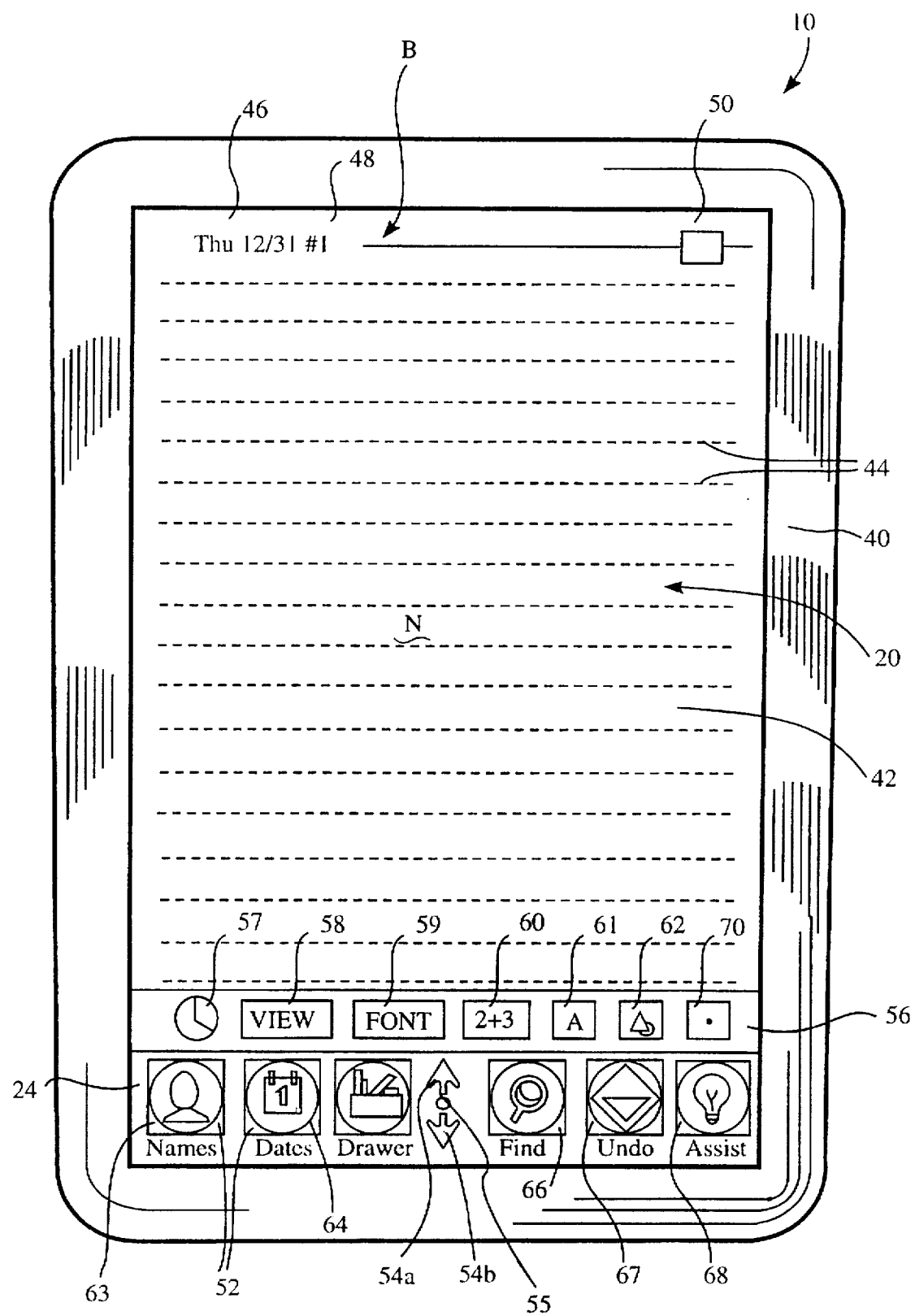
FIG. 2 is a top plan view of the screen, case and keypad of the computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N including a breaker bar B and a number of guidelines 44. The breaker bar B preferably includes the date of creation 46 of the note N, a note number 48 and a "router" button 50 which allows notes to be dispatched to a printer, facsimile, the trash, etc. The optional guidelines 44 aid a user in entering text, graphics, and data into the pen-based computer system 10.

In this preferred embodiment, the keypad 24 is not a part of the screen 42 but rather, is a permanent array of input buttons coupled to the CPU 12 by I/O circuitry 18. Alternatively, the keypad 24 could comprise "soft buttons" generated at a convenient location on the screen 42, in which case a "button" would be activated by touching the stylus to the screen over the image of the button. The keypad 24 preferably includes a number of dedicated function buttons 52, a pair of scroll buttons 54A, 54B and an overview button 55. The operation of the scroll buttons 54A and 54B, and other aspects of computer system 10 are discussed in greater detail in copending U.S. patent application Ser. No. 07/868,013, filed Apr. 13, 1992 on behalf of Tchao et al. and entitled "Method for Manipulating Notes on a Computer Display". That application is assigned to the assignee of the present application and its disclosure is hereby incorporated by reference in its entirety.

The function buttons 52 include an address button 63, a calendar button 64, a drawer button 65, a find button 66, an undo button 67, and an assist button 68. The overview button 55 has a variety of functions in different applications. However, as it applies to the present invention, it functions primarily to change the display mode.

The screen illustrated in FIG. 2 is referred to as the "notepad", and is an application program running under the operating system of the pen based computer system 10. In this preferred embodiment, the notepad is a special or "base" application which is always available beneath higher level applications. The notepad application, like other applications, runs within a widow, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 57, a view button 58, a font button 59, a formulas button 60, a text button 61, a graphics button 62, and a nib button 70. Co-pending application Ser. No. 07/976,970 filed Nov. 16, 1992 on behalf of Foster et al., entitled "Status Bar for Application Windows" and assigned to the assignee of the present invention describes the operation of the status bar, and is hereby incorporated herein by reference in its entirety.

As described in the above referenced application by Tchao et al., in one suitable embodiment of the present invention, a notepad application program is launched when the computer system 10 is turned on. The address button 63 can then be used to launch an address book application program. That is, when the address button 63 is depressed, a suitable address book application program is opened and a suitable address book dialog box is displayed on screen 42. Similarly, the calendar button 64 launches a calendar application program when depressed.

The undo button 66 will undo the latest user action when depressed and will redo the action if depressed a second time without the intervention of any additional user actions. The assist button gives the user access to a help menu which is designed to provide operating instructions to the user that may be helpful when the user is unsure of how to operate the computing system.

A "drawer", which is opened by pressing the drawer button 65 is used to store other application programs, tools, access buttons to external ROM cards, communications applications, and other items that can be utilized by the user. When the drawer is "opened", a drawer dialog box 95 is displayed on the screen 42. When the dialog box 95 is opened, the user can than launch any application stored therein merely by tapping on the associated icon that is displayed within the drawer dialog box 95. Thus, the icons serve as "soft buttons" which may be activated by tapping the screen at a location corresponding to the displayed position of the icon. Of course, in alternative embodiments, the applications that are accessed by hardwired keypad buttons can be varied widely. For example, additional keys could be added, existing keys removed, and/or the above described keys could be used to launch different applications.

It is noted that within this application reference will often be made to "tapping", "clicking on", "pressing" or otherwise selecting an object. These words are intended to interchangeably refer to the act of selecting the object. The term tapping is generally used in reference to the physical act of touching the stylus to the screen, which is a suitable method of selecting objects in a pen-based computing system. The term "clicking on" is intended to be broader in scope and is intended to cover not only tapping, but also the action of selecting an object using a button associated with a mouse or track ball as well as the selection of an object using any other pointer device.

Within each application, there are a number of records that make up an application file. In one suitable embodiment, each page (screenful) of text constitutes a separate record, with each record being given a record number that is unique within that application file. Thus, for example, within the calendar application file, there may initially be thirty records. These records would be given record numbers zero to twenty nine respectively.

If a particular record is deleted, no attempt is made to reuse that number. Rather, the record is treated as though it has no information in it. When new records are added, they are simply given the next higher record number. Thus, in the above example, the next record that is added (the thirty first record) would be given the record number thirty. In the described example, this would be true regardless of whether (for example) records numbers six and twelve had been deleted. The total number of records within a particular application file (f) is stored in memory. For the purposes of this application, the stored value representative of the total number of records within an application file (f) will be labeled "#files(f)".

The reason for this numbering system is to facilitate a docking system that permits the synchronization of the hand held pen based computer with a master station. However, such synchronization is not necessary to the present invention and it should be appreciated that a wide variety of record numbering and/or renumbering schemes could be used. Thus, if desired, a renumbering system could be implemented that renumbers certain records when a particular record is deleted. Alternatively, the record numbers of the deleted files could be reused in future records.

Each application file (f) is also given a unique application file number. Thus, by way of example, the notepad application file may be assigned the value "zero", the calendar application file may be assigned the value "one", the address application file "two" and so forth.

Figure 3:
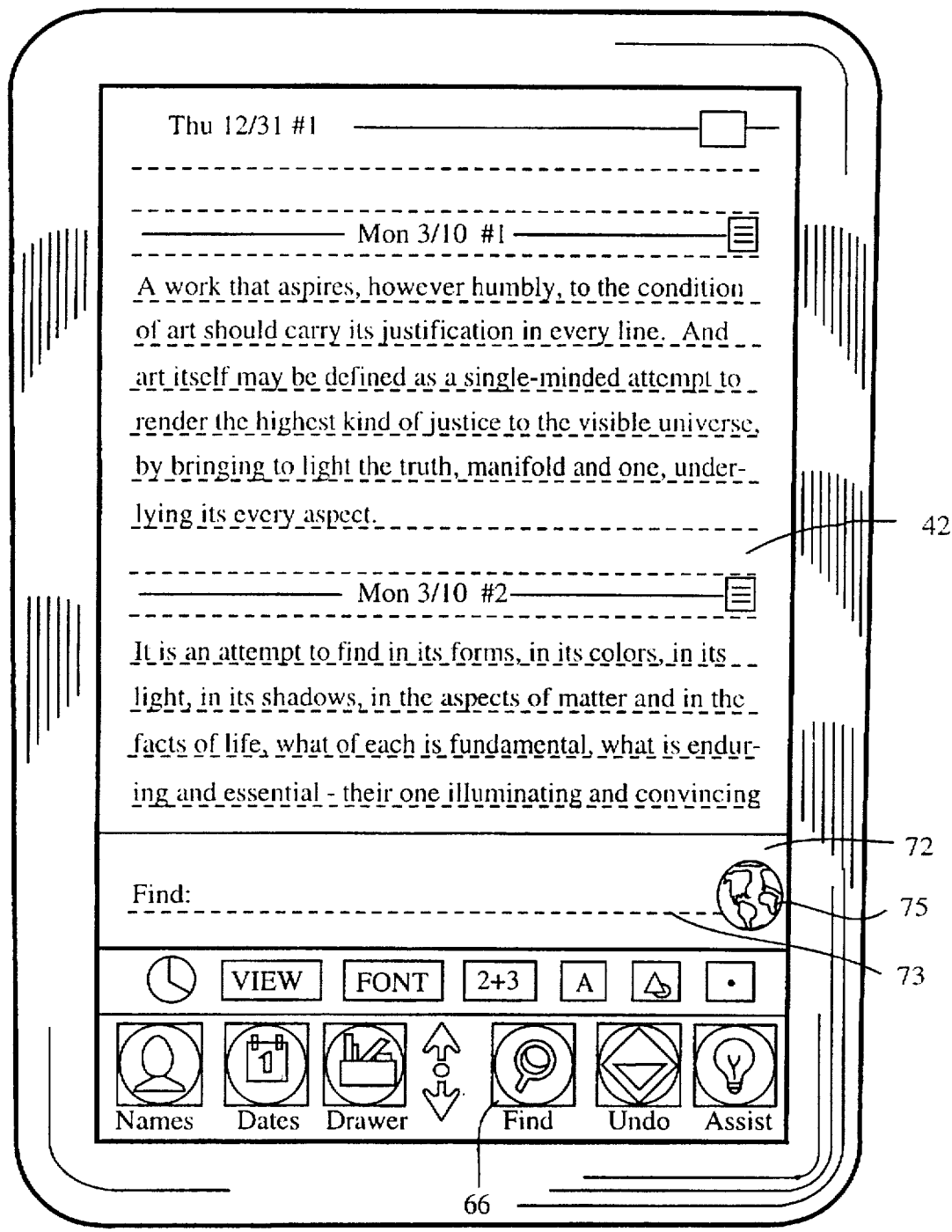
FIG. 3 illustrates a representative screen display for the display assembly shown in FIG. 2 when a find box is opened.

The "Find" button 66 is used to initiate a search for information. When the Find button is depressed, the CPU 12 causes a Find dialog box 72 to be displayed on the display screen 42 as seen in FIG. 3. The find box 72 includes a find line 73 which includes the prompt word "Find:" and a row of dots that make up a line. At an area near the end of the row of dots, a "global" icon 75 is displayed.

Once the Find dialog box 72 has been displayed, the user may enter a string of characters to be searched into the find line adjacent the "Find:" prompt. The string of characters may be entered by using the stylus 38 to "write" on the screen 42. Suitable character recognition software is then used to translate the written characters into text information that is understandable to the CPU 12. Alternatively, if information is already highlighted before the Find button 66 is selected, the highlighted information is used as the search string.

There are two types of searches that may be conducted. The first is referred to a "local" search mode, which searches only through the data base of the application that is currently active. The second is a "global" search mode which searches through the data bases of all of the application files that are suitable for searching. It should be appreciated that all of the application files may not be suitable for searching. For example, many types of graphics applications may not be suitable for searching.

If the user does nothing either before or after entering the search string, the search mode will default to the "local" search mode. The global search mode may be selected by tapping the stylus 38 on the screen 42 at the position of the global icon 75. When the global mode is selected, the global icon 75 is highlighted. The global mode can be unselected (i.e. the local mode can be reselected) by tapping a second time on the global icon 75. This removes the highlighting and reverts the search mode to the "local" mode. Thus, the search mode can be switched back and forth between the local and global modes merely be repetitive tapping of the global icon 75. In the embodiment shown, the global icon has the appearance of a globe, although of course a wide variety of graphical representations can be used as the global icon.

Figure 4:
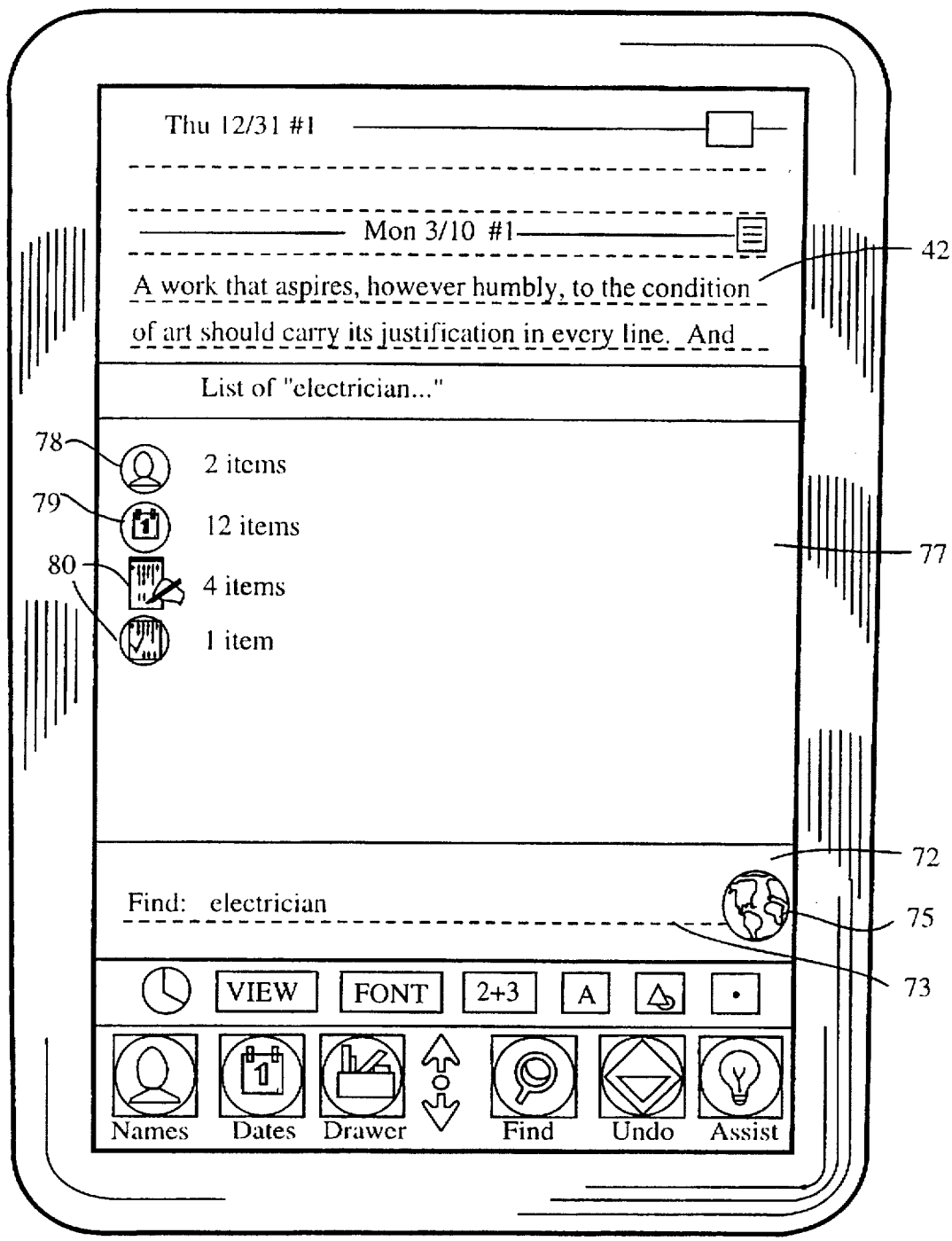
FIG. 4 illustrates a representative screen display with a search string entered and displaying a summary of the number of hits in each file after a global search.

FIG. 4 shows the screen 42 with a search string "electrician" entered in the find line 73. After the search string has been entered, the CPU waits a predetermined length of time to insure that the user does not wish to modify the search string. By way of example, suitable waiting times may be in the range of one to two seconds. If the predetermined length of time expires without the receipt of any user inputs, a search is conducted. If the global search mode is selected, then a global search is conducted. If the global search mode is not selected, then a local search is done.

Referring next to FIG. 4, the results that will be displayed at the conclusion of a global search will be described. Initially, a summary box 77 is displayed with a header bar that displays the text "List of "[search string] . . . " ", wherein the actual search string is written between the quotes. In the example shown in FIG. 4, the search string is "electrician". Below the header bar, each of the application files searched is identified, together with an indication of the number of record (hits) that the search string was detected within that particular application file. As seen in FIG. 4, a small icon is used as the identifier for each of the searched files. The small icon identifiers are arranged in a column near the left side of screen 42.

An indication of the number of records in which the search string was found in each application file is provided to the right of their associated icons. Thus, by way of example, suppose that two hits were recorded in the address book and 12 hits were recorded in the calendar. In this situation, a suitable message such as "2 items" is printed to the right of the address book identifier 78 and a suitable message such as "12 items" is printed next to the calendar identifier 79. If no hits are found in a particular application, the message beside the associated indicator would be "0 items", although in an alternative embodiment, such listings could be eliminated entirely.

Figure 5:
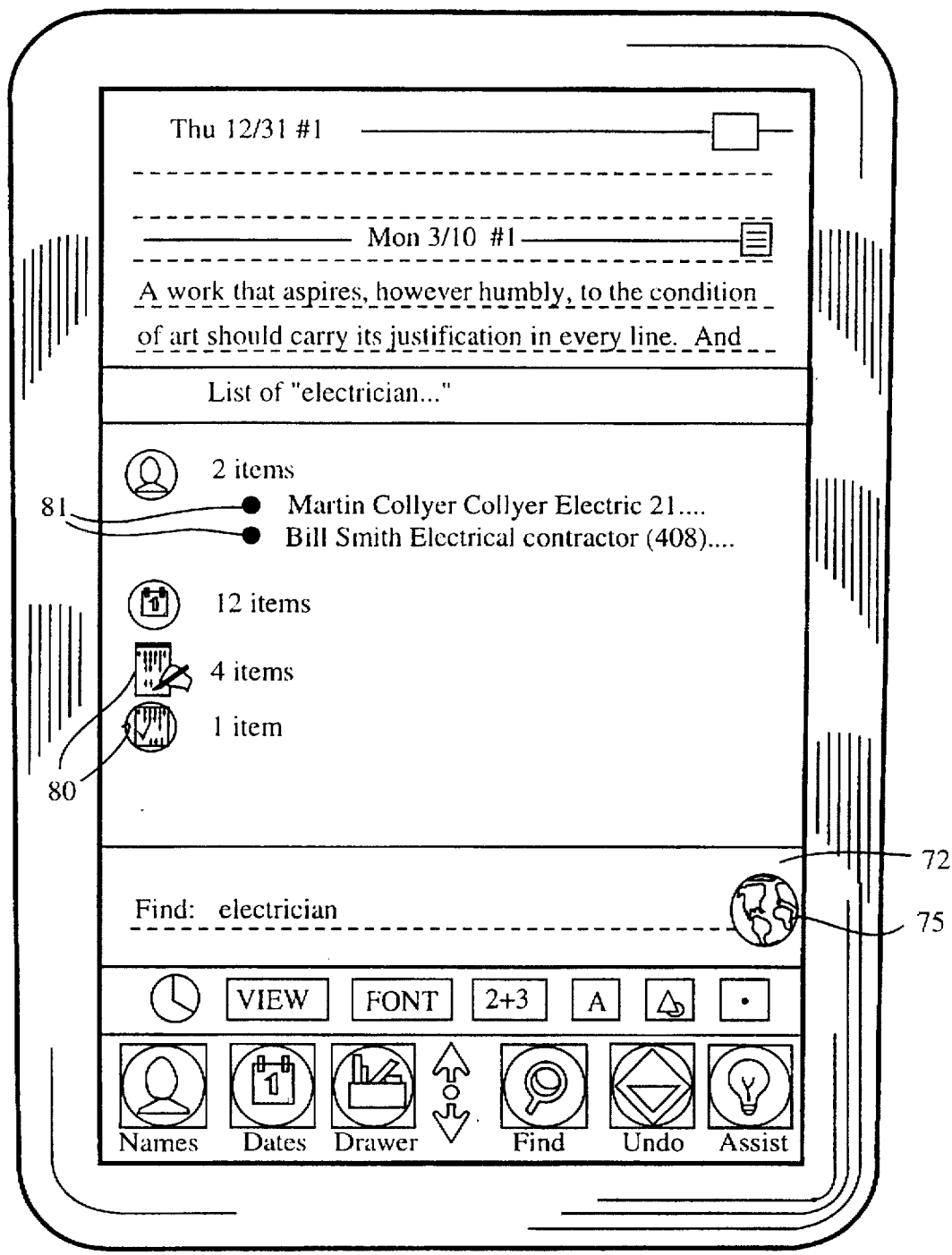
FIG. 5 illustrates a representative screen display when the address file summary shown in FIG. 4 is expanded.

To see an expanded view of hits within a selected application file, the user merely taps the screen 42 at the location of the small icon identifier associated with the selected application file. When a particular application file is expanded, a row is provided for each hit and a short (one line) entry from the corresponding record. Continuing with the "electrician" example, the address book entry may be expanded as shown in FIG. 5 by tapping the address book identifier 78. A column of markers 81 that in the embodiment shown take the form of enlarged dots then appear beneath the address book indicator 78, with one marker being provided for each "hit" within the address book. Then, in a row beside the marker, a short extract such as the first few words of the record or a the sentence that includes the search string is displayed. The remaining indicators 79, 80 are then displayed below the last of the displayed address book records.

If there are a large number of entries from an expanded application file, then there may be more hits than can be displayed at one time. In such cases, the additional hits can be displayed by using the scroll buttons 54A, 54B. In order to collapse an expanded entry (i.e. to eliminate the expanded view of all of the records in a particular application file), the user merely taps a second time on the associated indicator.

Figure 6:
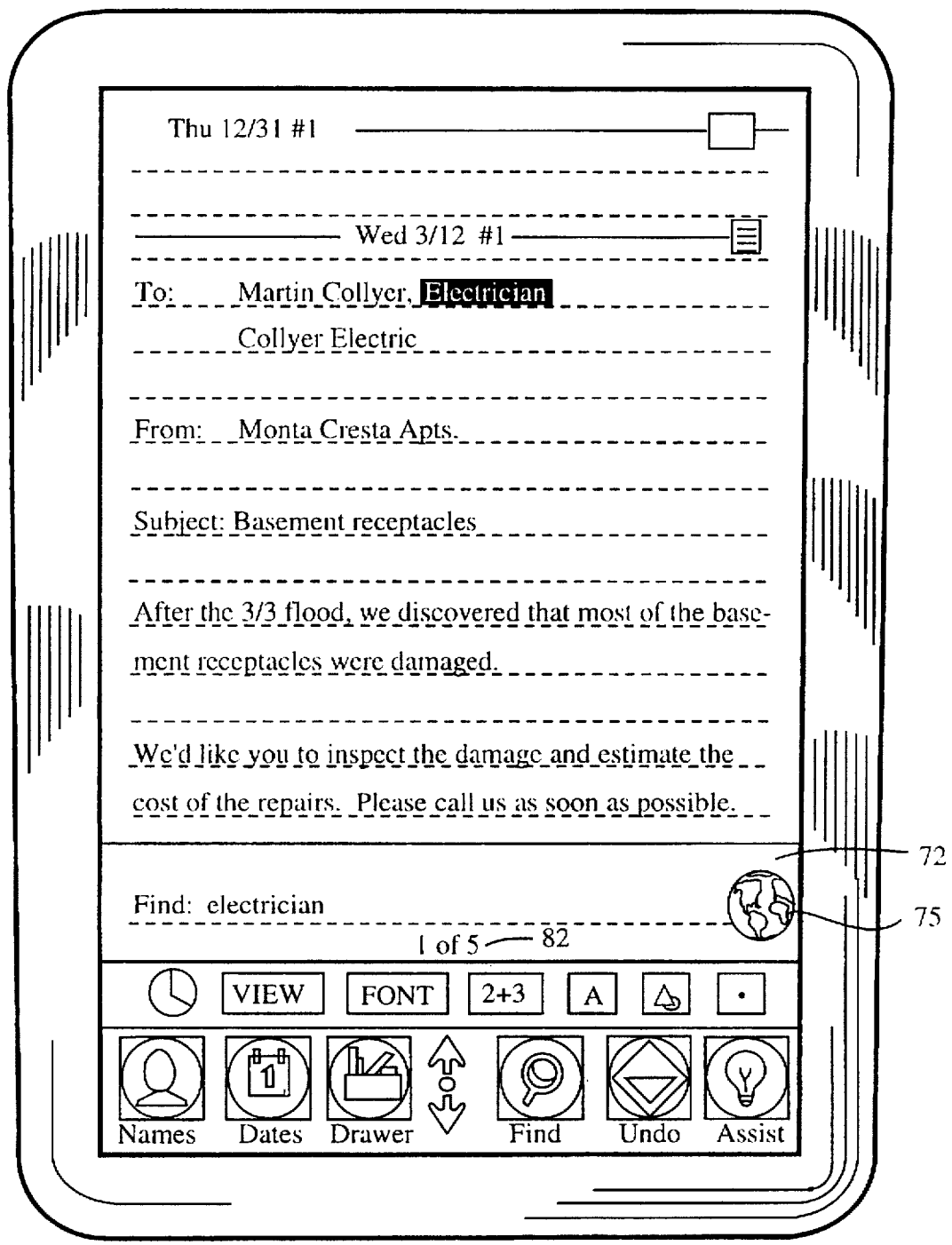
FIG. 6 illustrates the screen display after a search in the notepad with the results displayed in full page display format.

In order to view a particular entry, that is indicated in the expanded display, the user merely taps on the marker associated therewith. In such a case, the entire record (which may be a full screen of text) associated with the selected entry is displayed on the screen as seen in FIG. 6. At the bottom of the screen, the find box 95 remains, and a small counter 82 appears in the bottom center of the find box that indicates the hit number, and the total number of hits within the associated application file. This is done by writing "X of Y", where X is the hit number, and Y is the total number of hits within the associated application file.

When the system is in the full page display mode, the next (or previous) entries can be viewed by pressing the scroll button 54B (or 54A) respectively. In the full display mode, the scroll buttons 54A, 54B page the display. That is, each time a scroll button is depressed, the next (previous) page of information is displayed, rather than simply the next (previous) line of information. As indicated above, in the described embodiment, each page of text is considered an independent record. Therefore, pressing the scroll buttons permits the user to scroll through the records. Of course, in alternative embodiments, line by line scrolling could be provided.

If the scroll down button 54B is depressed when the last record is being viewed, then the display effectively wraps around. That is, the first record is displayed. Similarly, if the scroll up button 54A is depressed when the first record is being viewed, then the display wraps in the other direction such that the last record is displayed.

The find operation can be terminated merely by pressing the find button 66 while the find box 72 is opened. Since the find box 72 is always open during the execution and displaying of a search, the find operation may be terminated at any time. Thus, the find function can be both initiated and terminated by sequentially pressing the find button 66.

If the user wishes to conduct a second search after the first search has been concluded, then the existing search string can be erased and a new search string substituted in its place. Alternatively, the find operation may be terminated and then restarted as an entirely new operation by pressing the find button 66 twice. In the described embodiment, a new search can be conducted merely by writing a new search string into the find box 72. That is, when an new word or phrase is written into the find box 72 it is treated as the search string to the exclusion of the current search string. However, in alternative embodiments, the new word could be used to narrow the scope of the existing search. In such an arrangement, a delete gesture would be used to erase the original search string when desired.

In the described embodiment, an expanded display mode as seen in FIG. 5 is displayed after an indicator is tapped. However, in an alternative preferred embodiment, the expanded display mode is skipped and the full page display mode is entered. With this arrangement, the overview button 55 can alternatively be used to provide the expanded display mode as seen in FIG. 5, or it can provide an overview as discussed below with respect to the description of the local search interface. In the latter case, the expanded display mode may be skipped entirely.

Figure 7:
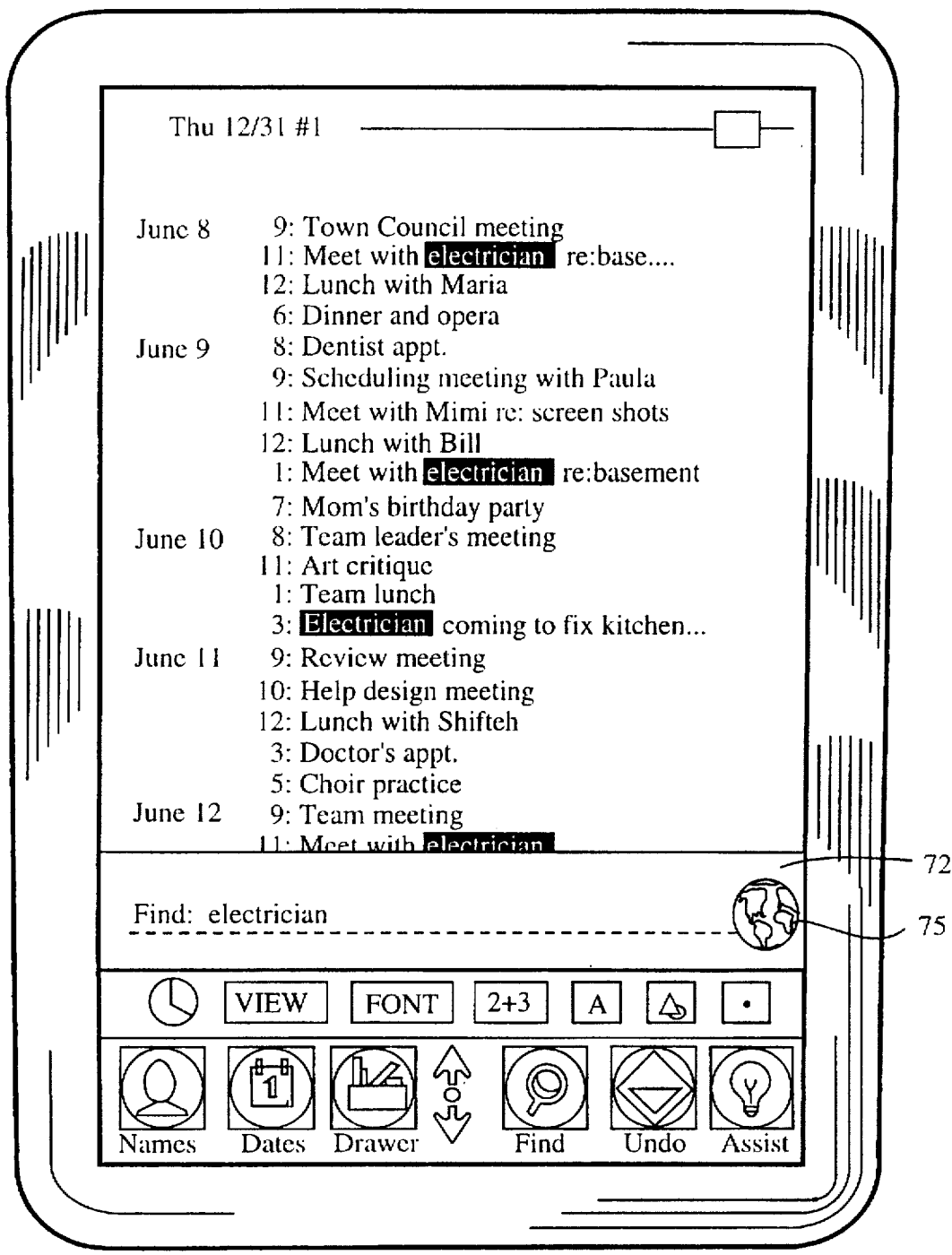
FIG. 7 illustrates the screen display after a local search in the Calendar file with the results displayed in overview mode.

Referring next to FIGS. 6 and 7, the screen display that occurs after a local search will be described. As indicated above, if a global search is not specifically requested by selecting the global icon 75, then a local search will be performed in the active application file. Therefore, by way of example, if the user wishes to conduct a local search in the calendar application file, the first step is to open the calendar by pressing the calendar button 64. Thereafter, the find button is pressed and the find box 72 appears at the bottom of the display screen 42. The user is then free to write the desired search string in the find box and as previously described, a search will be automatically performed once a short break occurs after the search string has been entered. Assuming that the user has not tapped on the global icon, the search will be a local search.

In a local search, the initial display mode is the full page display mode. Thus, the full text of the first record that contains the search screen will appear on the screen. Like in the full page display mode of the global search, the find box 95 remains at the bottom of the screen 42 and a small counter 82 appears at the bottom center of the find box. The counter 82 indicates the hit number, and the total number of hits within the associated application file. Paging through the hits in the full display mode is exactly the same as the paging previously described with respect to paging through the hits in a particular application file after a global search has been performed. Accordingly, the next (or previous) entries can be viewed by pressing the scroll buttons 54B (or 54A) respectively. In the full display mode, the scroll buttons 54A, 54B page the display. That is, each time a scroll button is depressed, the next (previous) page of information is displayed, rather than simply the next (previous) line of information. When an end record (i.e. the first or last record) is being viewed and the user taps a scroll button in a direction that would be outside the record list, the display will wrap around to the opposite end of the hit record list. Thus, the user can readily scroll back and forth among the pages that contain the target text in the current application file by simply tapping the scroll buttons 54A and 54B.

To view an overview of the items found in a local search, the user merely taps the overview button 55 located between the scroll arrow buttons 54A and 54B. The overview mode in a local search is somewhat different than the expanded summary mode discussed above in relation to a global search. Specifically, in the local overview mode, a summary of the entire application file is presented with the occurrences of the target text highlighted. This is different than the expanded summary of a global search where only a summary of the hits is provided. The format of the local search summary is preferably the same as the format of the application's overview apart from the searching protocol. By way of example, a representative overview of a local search of a To Do list is shown in FIG. 7.

The global icon 75 always remains in the find box 72. Therefore, the scope of the search may be broadened to all of the application files merely by tapping on the global icon 75. When the user taps on the global icon 75 after a local search has been performed, the system will automatically conduct a global search using the current search string. Alternatively, if the user taps on a button (such as address button 63 or calendar button 64) after a local search has been performed in a different application file, then a local search is conducted in the newly selected application file.

Figure 8:
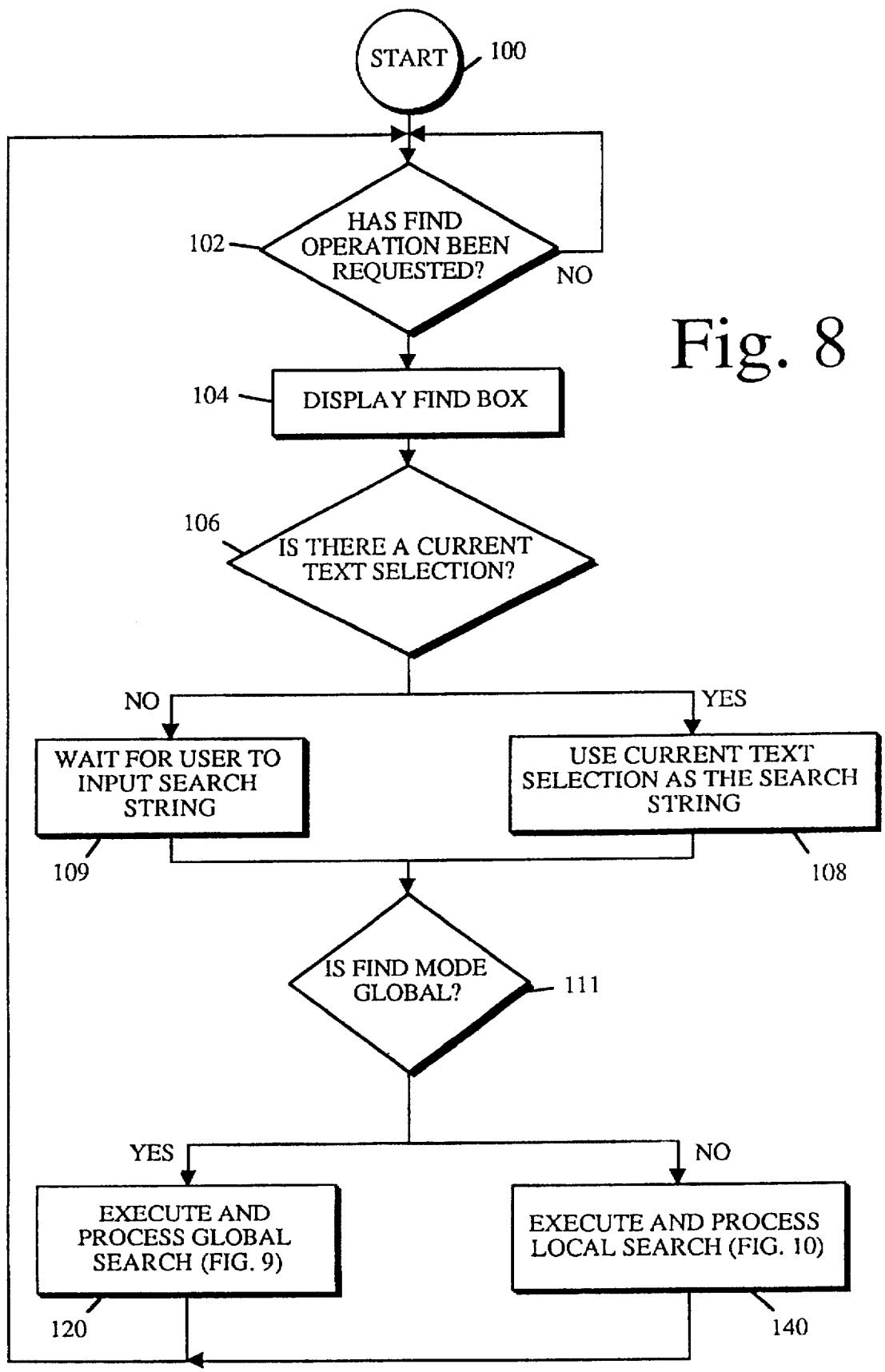
FIG. 8 is a flow diagram illustrating a method of conducting a Find operation.

Referring next to FIGS. 8–15, suitable algorithms for executing various find operations will be described. As seen in FIG. 8, the process begins at step 100. Then in step 102, the CPU determines whether a FIND operation has been requested. That is, has Find button 66 been selected. If not, the CPU performs other tasks until a find operation is requested. Thus, for the purposes of the find and display algorithm, the CPU effectively waits at step 102 until the Find button 66 is selected. Once the find button has been selected, the find box 72 is displayed in step 104. In the embodiment shown in FIGS. 3–7, the find box is displayed at the bottom side of the screen 42.

In step 106, the CPU 12 determines whether there is a current text selection. If so, in step 108, the current text selection is chosen as the search string and is thus displayed in find box 72 after the prompt "Find:". On the other hand, if there is not a current text selection, the system waits for the user to input a search string in step 109. After the user inputs a search string, the CPU waits a designated period of time (for example one second) to make sure that the user has completed the entry of the search string. If the user writes additional text during the waiting period, then the waiting period is restarted. When the waiting step has expired in step 109 or once the highlighted text string has been input in step 108, the process moves to step 111.

In step 111, the CPU determines whether or not the find mode is global. This is accomplished by determining whether the global icon 75 is selected. If global icon 75 has been selected then a global search is executed in step 120. If the global icon 75 has not been selected, then a local search is executed in step 140. The search results are then displayed and may be viewed by the user and processed in conjunction with various user inputs. Thereafter, when the search summaries are dismissed, the process returns to the beginning at step 100.

Figure 9:
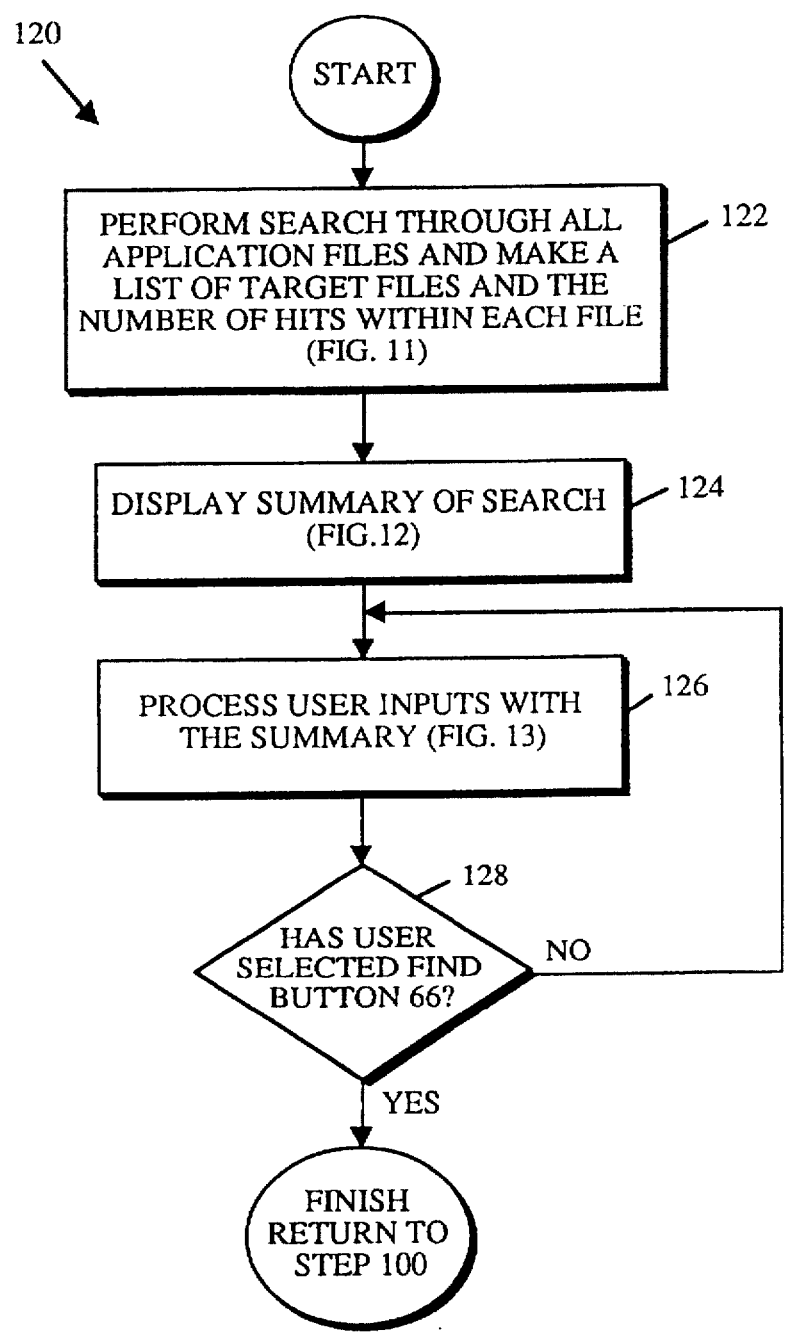
FIG. 9 is a flow diagram illustrating a method of executing, displaying and processing a global search.

Referring next to FIG. 9, the global search process 120 will be described in more detail. Initially, in step 122, a search is performed through each of the application files and a list is made of each application file (target file) having an occurrence of the search string together with an indication of the number of occurrences of the search string (hits) within each application. This process will be described in more detail below with reference to FIG. 11. After the search has been performed, a summary of the search is displayed in step 124. An example of this summary display is shown in FIG. 4. A more detailed explanation of the algorithm for displaying the summary will be provided below with reference to FIG. 12.

After the summary of the search results has been displayed, any user inputs are processed in conjunction with the summary in step 126. The user input processing steps are described in more detail below with reference to FIG. 13. After any such user inputs have been processed, the CPU determines whether the find operation has been terminated in step 128. If so, the find procedure is completed and the logic returns to the start 100 where it waits for the next FIND operation to be requested as described above with reference to FIG. 8. The find operation may be terminated simply by pressing the find button 66. In an alternative embodiment, the find operation may also be terminated by tapping a close button provided in the find box (such as at the upper right hand corner of the find box). If the find operation has not been terminated, the logic returns to step 126 where it processes new user inputs (if any). Thus, a loop between steps 126 and 128 is formed until the find operation is terminated or a new search string is entered.

Figure 10:
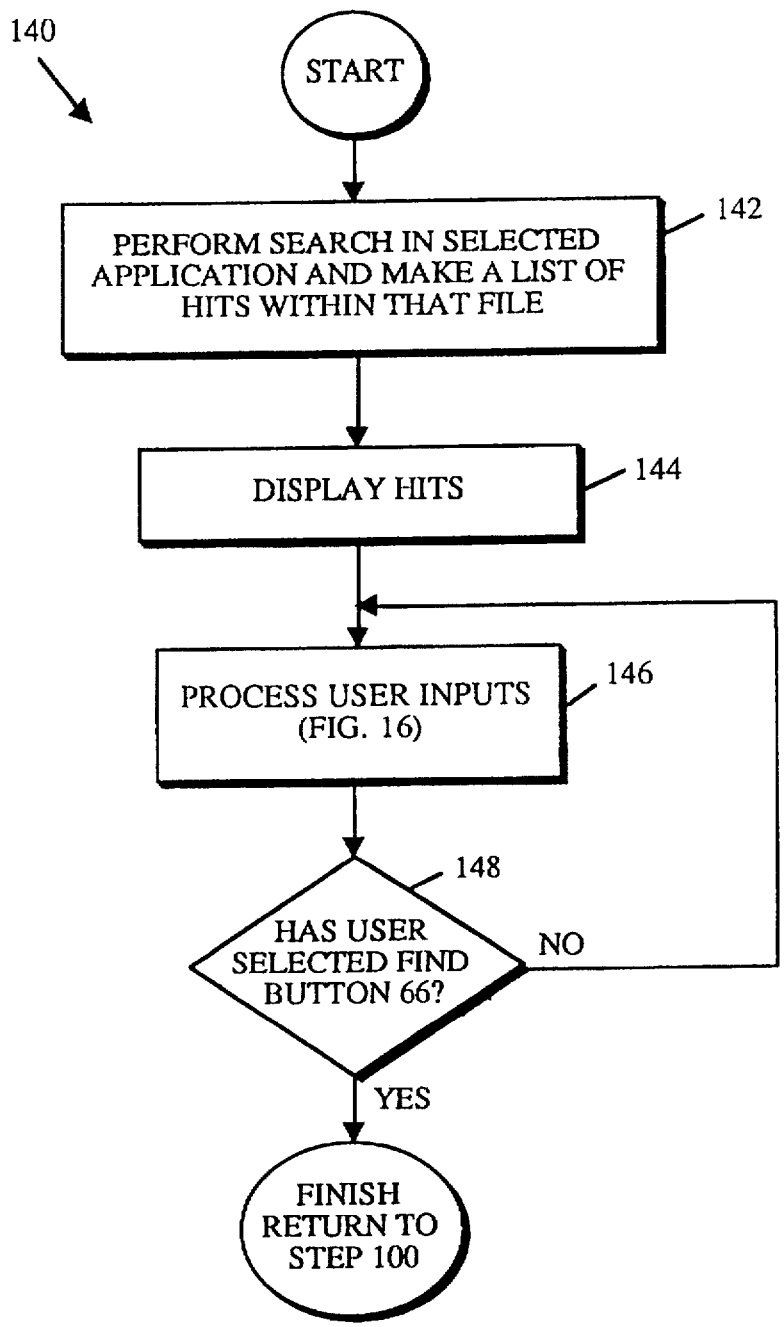
FIG. 10 is a flow diagram illustrating a method of executing, displaying and processing a local search.

Referring next to FIG. 10, the local search algorithm will be described. Conceptually, the local search algorithm resembles the global search algorithm, however the mechanics of the search and the displayed items vary somewhat. Initially, in step 142 a search is performed in the selected application and a list is made of the occurrences of the search string (hits) within the application. The results of the search are then displayed in step 144. The initial display mode for a local search is the full record display mode with the occurrences of target text (search string) highlighted. Therefore, the first record that is found is displayed. Also, the indication of the displayed hit number and the total number of hits discovered during the search is displayed at the bottom center of the Find dialog box 72.

After the initial record display, any user inputs are processed in step 146. The details of the user input processing step 146 will be described in more detail below with reference to FIG. 14. After the user inputs have been processed, the CPU determines whether the find operation has been terminated in step 148. Again, the termination of a find operation occurs when find button 66 is pressed. Like in the global search sequence, the search is completed and the logic returns to starting point 100 when the find operation is terminated. On the other hand, when the find operation has not been terminated, the logic returns to step 146 where it processes new user inputs (if any). Thus, a loop between steps 146 and 148 is formed until the find operation is terminated.

Figure 11:
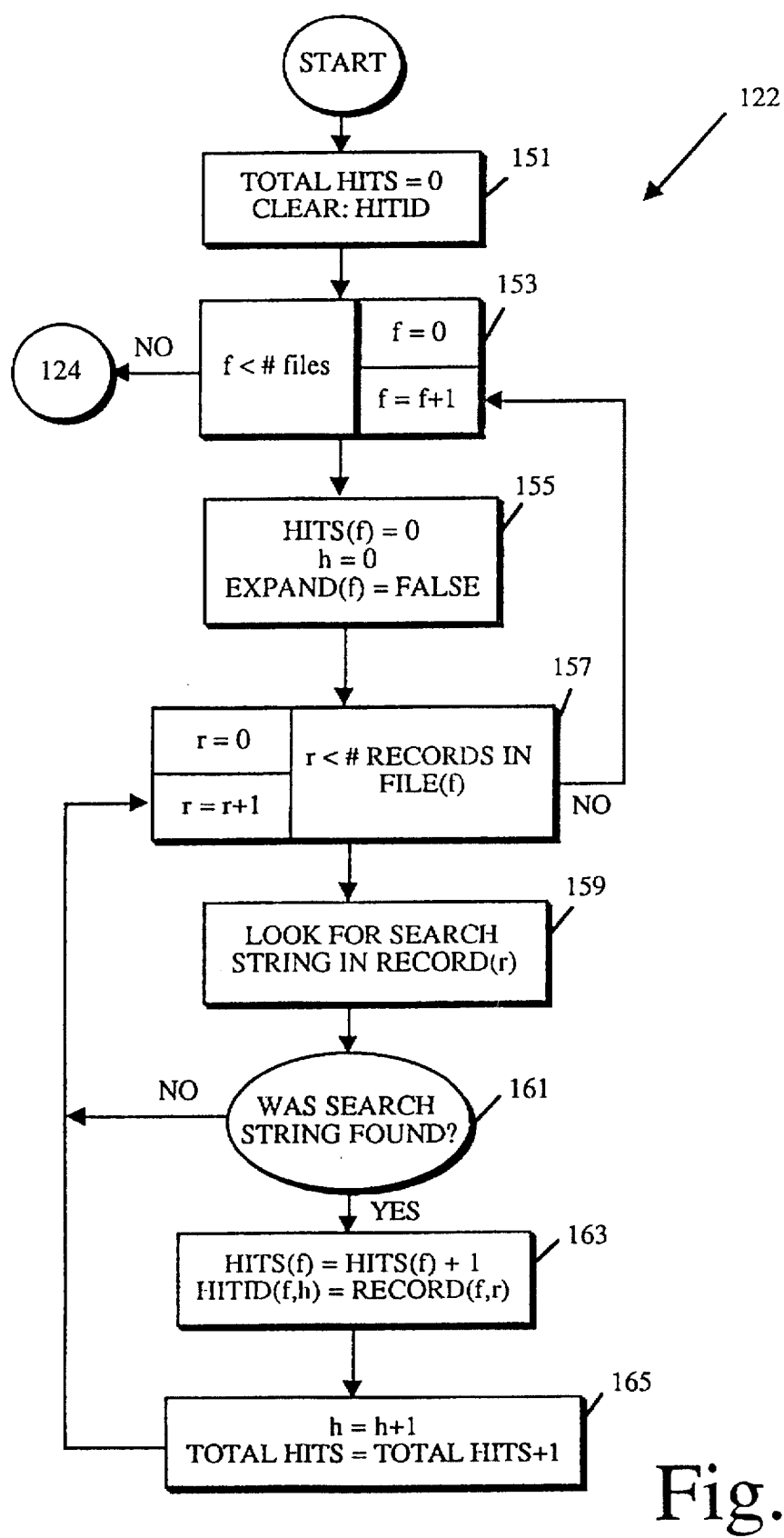
FIG. 11 is a flow diagram illustrating a method of searching through multiple application files and making a list of target files identified by file and record numbers.

Referring next to FIG. 11 a suitable search algorithm for the global searching step 122 will be described. In this algorithm, "f" is a counter for application files, "#files" is a variable that indicates the total number of application files that have searchable data, and "hits[f]" is an array that stores the number of hits in each application file (f). Similarly, "r" is a counter for records in a particular file, "h" is a counter for hits within a particular file, and "#records(f)" is an indication of the total number of records in the particular file (f) being searched. "Hit ID[f,h]" identifies each hit by file number and record number, while "TotalHits" is a variable that indicates the cumulative total number of hits.

The searching function begins in step 151 by clearing the value TotalHits and the two dimensional array Hit ID[f,h]. Steps 153–157 form a first loop that insure that each of the application files is searched. The loop begins in step 153 with "f" being set to zero so that application number zero is searched. A file loop is thus started to insure that each of the applications (files) is searched. The application files are searched serially from the first identified application file f(0) to the final application file. Thus the total number of applications searched will be all of the applications that have searchable data bases. That is, the value "#files". In step 155, the values Hits(f) and h are set to zero and the display mode for the summary of file (f) is set to collapsed (i.e. not expanded).

Thereafter, in steps 157–165 a second loop is formed which insures that each record in the current file (f) will be searched. The second loop begins at step 157 where the value "r" is set to zero. Then, in step 159 the CPU determines whether the designated search string is located in record (r), which in the initial case is record (0) since "r" is set at zero. This is accomplished using a conventional find comparison routine. In step 161 the routine determines whether the designated search string was found. If not, the logic returns to step 157 where the value of counter "r" is incremented by one. Thereafter, the next record (i.e. record (1)) is searched and the loop of steps 157, 159 and 161 is continued until either the search string is found, or all of the records in the first application file (file(0)) are searched.

When a search string is detected in step 161, the hit is recorded in step 163. Thus, the hits counter [hits(f)] for file "f" is incremented by one and the record in which the search string was found [record (f,r)] is saved as its associated hit record, Hit ID (f,h). Thus, by way of example, if the first record having the designated search string is record number 4 in application file number 0, then Hit ID (0,0) would store the fifth record (record 4) of file (0). After the hit has been recorded in step 163, the counter "h" and the value "Total-Hits" are each incremented by one in step 165. Thereafter, the logic returns to step 157 where the counter "r" is incremented and the record searching loop is continued. This record searching loop is continued until the counter "r" reaches the number of records "#records" in file (f), at which time all of the records in the designated file (f) have been searched.

After all of the records in a particular file have been searched, the logic returns to step 153 where the counter "f" is incremented by one. If additional application files remain to be searched, the counter "h" and value Hits(f) are cleared in step 157 and the previously described record searching loop of steps 157–165 is repeated for the next application file. This process is then repeated until the value of counter "f" equals the total number of application files "#files". At that point, all of the records in all of the application files have been searched and the logic moves on to the search summary display step 124.

Figure 12:
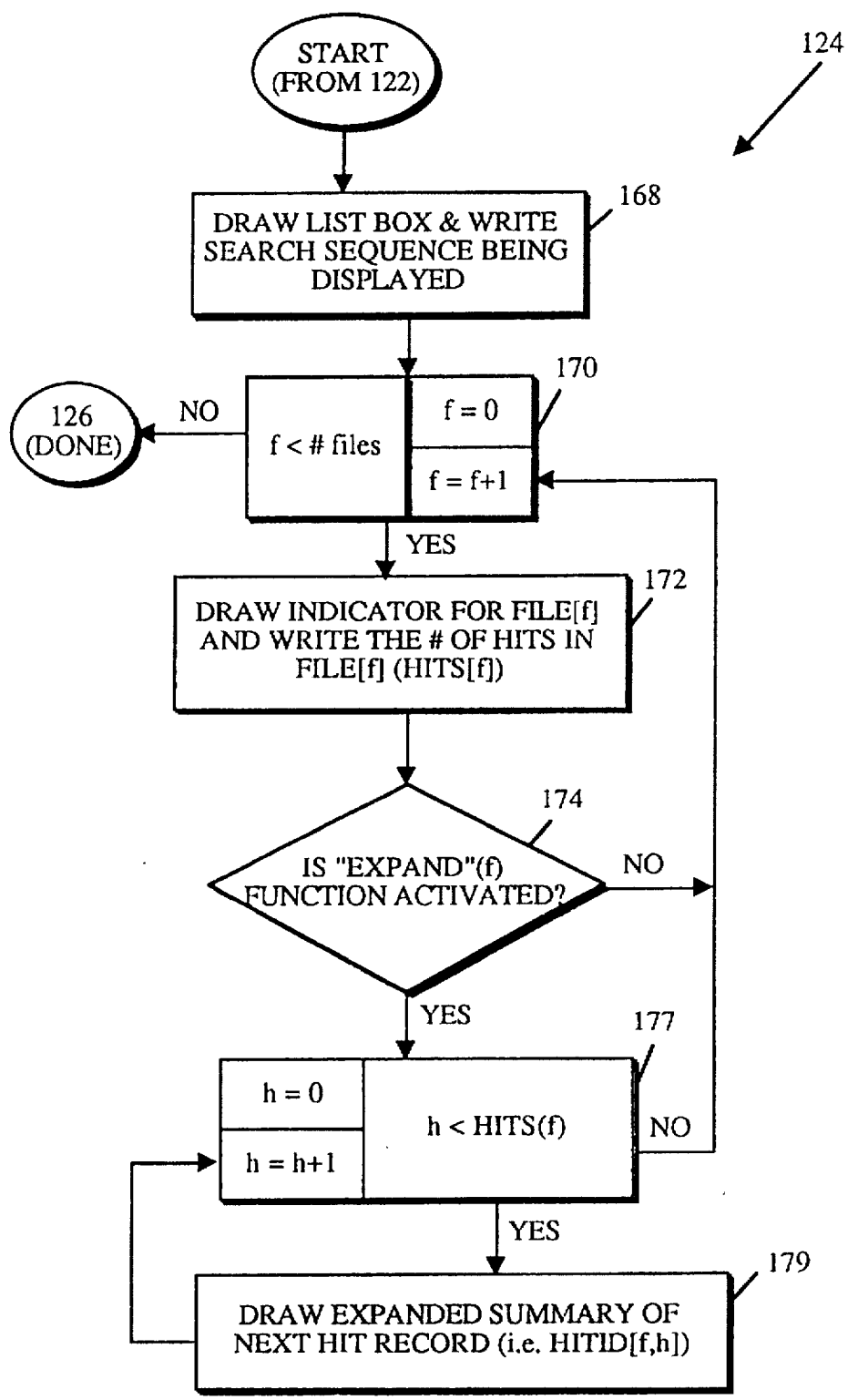
FIG. 12 is a flow diagram illustrating a method of displaying the results of a global search.

Referring next to FIG. 12, the search summary display step 124 will be described. The search summary display process begins at step 168 where the global summary box is drawn together with an indication of the search string as shown in FIG. 4. Thereafter, in step 170 a summary display loop is initiated. Initially a counter "f" is set to zero. Then in step 172 the indicator for application file "f" is drawn. Thus, by way of example if application file f(0) is the address book, an address book indicator 78 that may take the form of a small icon is drawn initially. After the indicator is drawn, the value of Hits(f) and the word "item(s)" are written in sequential order. Actually the word "items" is written in all cases except when the value of Hits(f) is one. In that case, the word "item" is used.

After the appropriate summary information for application file "f" has been written, the CPU determines whether the "Expand" function for application "f" has been activated in step 174. The "Expand" function is activated by clicking on the indicator (e.g. 78, 79, 80 etc.) associated with file "f". Since the value of Expand (f) is set to "collapsed" (non-activated) during the initial global search, in at least the initial summary display the "Expand" function will not be activated for any of the summaries. However, since the same display code is used to display "expanded" summaries, step 174 is included.

If the "Expand" function has not been activated, the logic returns to step 170 where the counter "f" is incremented by one and the process of steps 170–174 is repeated until the summaries for all of the suitable data files have been written. Note that when the value of counter "f" is incremented in step 170 such that it reaches the number of searchable data files "#files", all of the summaries have been displayed and the logic moves on to user input processing step 126.

If, in step 174, the CPU determines that the "Expand" function has been activated for a particular application file, a one line overview of each of the hits in that file are displayed below the associated summary as seen under the address book entry in FIG. 5. Of course, the actual amount of information displayed within the expanded summary can be varied extensively in accordance with the needs of a particular system. Alternatively, the user could be given control over the amount of information displayed.

Expanded summaries of the various hits that occurred in a particular application file (f) are displayed sequentially during a loop created by steps 177 and 179. Specifically, in step 177 a loop is created and a counter "h" is set to zero. Then, in step 179, an expanded summary of hit record number (h) in file (f) is drawn. That is, an expanded summary of Hit ID[f,h] is drawn. Naturally the first expanded summary would be the summary for Hit ID[f,0]. After each expanded summary has been written, the logic returns to step 177 where the counter "h" is incremented and the next record is displayed in step 179. This loop is continued until the value of counter "h" reaches the value of Hits(f), at which point the loop is terminated and the logic returns to step 170 to display the next file summary.

Figure 13:
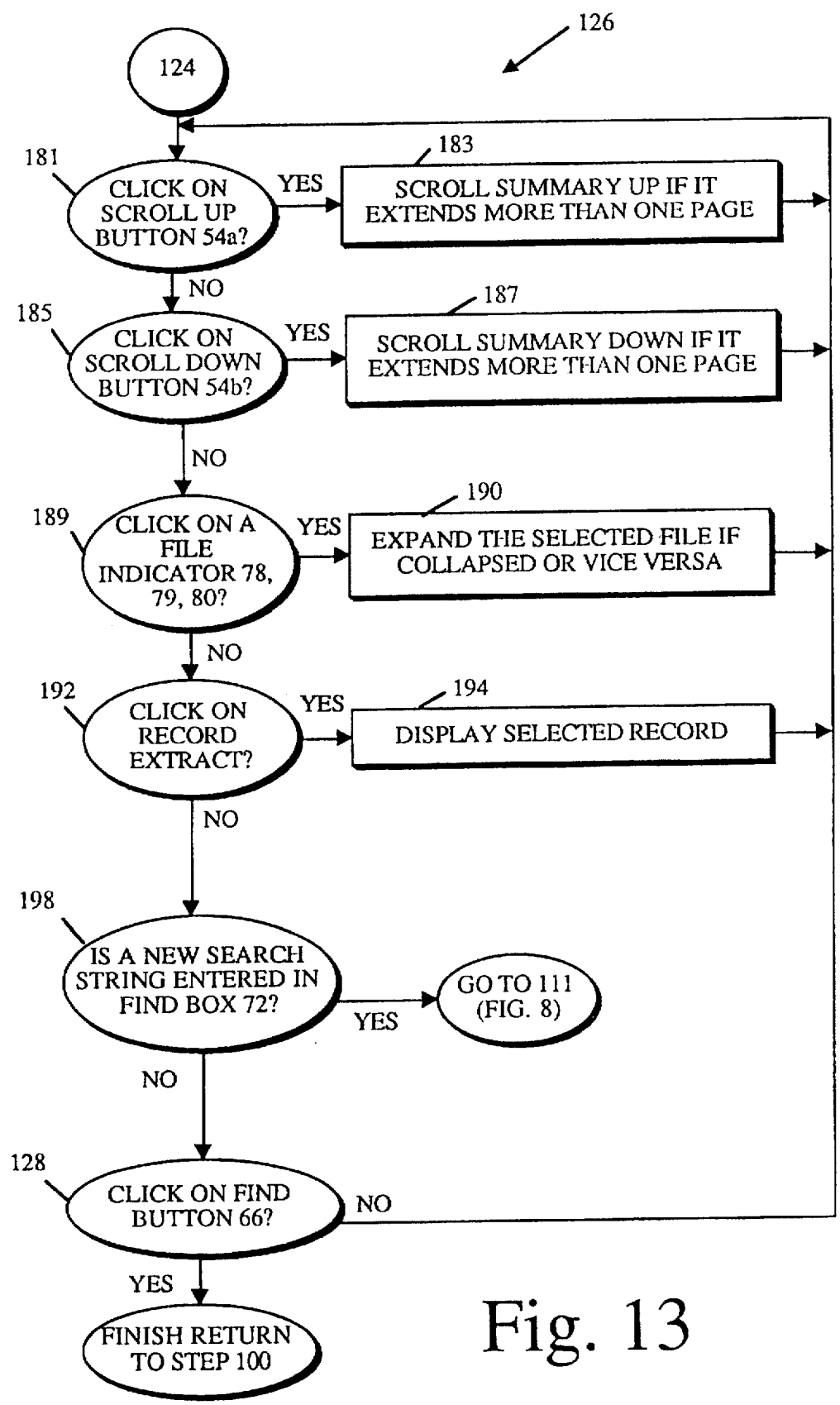
FIG. 13 is a flow diagram illustrating a method for processing a user input after a global search has been conducted and is displayed.

Turning next to FIG. 13, the user input processing step 126 will be described. First, in step 181, the CPU checks to determine whether the upwards scroll button 54A has been pressed. If so, in step 183, the summary is scrolled so long as it extends more than one page. If the summary does not extend more than one page, no scrolling occurs. If the upwards scroll button 54A has not been pressed, then the process moves to step 185 where the CPU checks to determine whether the downwards scroll button 54B has been pressed. If so, the summary is scrolled downwards. Again, scrolling only occurs when the summary extends more than one page.

When neither of the scroll arrows has been selected, then the CPU moves to step 189 where it checks to determine whether any of the small file indicator icons has been tapped. If so, in step 190, the value "Expand (f)" where (f) is set to "expanded" if it is currently collapsed, or to "collapsed" if it is currently expanded. Then the logic moves to step 124 where the display routine is reexecuted. By way of example, FIG. 4 shows a summary wherein all of the file displays are collapsed, whereas, FIG. 5 shows a summary wherein the address list display is expanded, while the remaining file displays remain collapsed.

If none of the application files indicators have been selected, then in step 192 the CPU checks to determine whether any of the expanded record extracts have been selected. If so, the selected record is displayed and the display mode is switched to the full page display mode in step 194. By way of example, FIG. 6 shows a fully displayed record.

If none of the record extracts have been selected, then in step 198, the CPU determines whether a new search string has been entered into the find box 72. If so, the logic goes to step 111 (FIG. 8) and a new search is performed using the new search string.

If a new search string has not been entered, the logic moves to step 128 where is checks to see whether the find button 66 has been selected. If so, the find operation is terminated, the find dialog box 72 is removed from the screen 42 and the logic returns to step 100 to process other user inputs until the next find operation is requested by tapping find button 66. On the other hand, when the find button 66 has not been selected, the logic will loop back to the beginning of the user processing routine (step 181) and the aforementioned steps will be repeated. Similarly, after any of the user input processing steps 183 (scroll up), 185 (scroll down), 190 (expand/collapse), and 194 (display record),the logic will loop back to the beginning of the user processing routine at step 181.

In a preferred embodiment, the computer system is capable of executing other normal operations while the find box 72 is displayed. If a selected operation requires display space on screen 42, then the summary box 77 may be written over. However, the find box 72 will remain displayed until it is actually dismissed. In alternative embodiments, the act of executing other normal operations or selected operations can serve to terminate the find operation.

Figure 14:
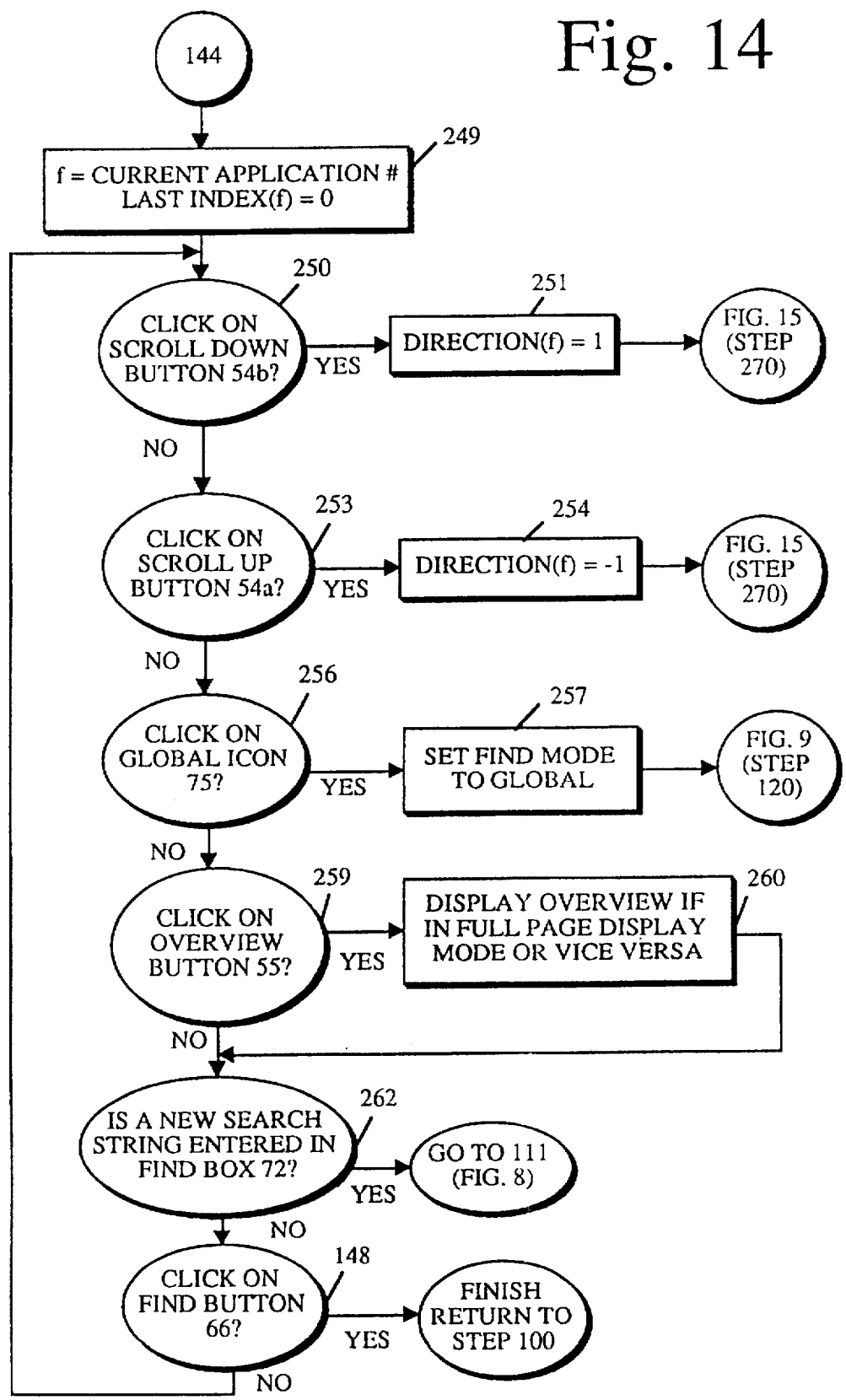
FIG. 14 is a flow diagram illustrating a method of processing a user input after a local search has been conducted and is displayed

Turning next to FIG. 14, a suitable algorithm for processing user inputs (step 146) within a local search will be described. Initially, in step 249, the value "f" is set to the current application number and the value "Last Index[f]" is set to zero (0). Then in step 250, the CPU checks to determine whether the upwards scroll button 54A has been pressed. If so, in step 251, the value "Direction [f]" is set to one (1) and then the logic moves to the scrolling algorithm as discussed below with respect to FIG. 15. If the upwards scroll button 54A has not been pressed, then the process moves to step 253 where the CPU checks to determine whether the downwards scroll button 54B has been pressed. If so, in step 254 the value "Direction [f]" is set to negative one (−1) and the logic again moves to the scrolling algorithm discussed below with respect to FIG. 15.

When neither of the scroll arrows has been selected, the CPU moves to step 256 where it checks to determine whether the global icon 75 has been selected. If so, the find mode is set to "global" and the logic moves to step 120 (see FIG. 9), where a global search is performed on the current search string. If not, the CPU 12 moves to step 259 where it determines whether the overview button 55 has been selected. If so, (and the current display mode is the fill page display mode) in step 260 an overview of the search results is displayed as seen in FIG. 7. On the other hand, if the current display mode in step 260 is the overview display mode, then the display mode will switch back to the full page display mode. If the overview button 55 has not been pressed, the logic moves to step 262 where it determines whether a new search string has been entered in find box 72. If so, a new search is performed using the new search string and the logic returns to step 111.

If a new search string has not been entered, then the logic moves to step 264 148, where it determines whether the find button 66 has been tapped. If the find button 66 has been selected, the find operation is terminated, the find dialog box 72 is dismissed and the logic returns to step 100 to process other user inputs until the next find operation is requested by tapping find button 66. When the find button 66 has not been selected, the logic loops back to step 250 to process any further user inputs. This loop will continue until the user inputs a command that causes the logic to exit the loop.

In embodiments where a new local search will be performed after a new application file has been selected, an additional step is added between step 262 and 248. In this step the logic would determine whether a new application has been selected. If so, a local search would be performed in the newly selected application. This is accomplished by having the logic return to step 111 is a new application has been selected.

Figure 15:
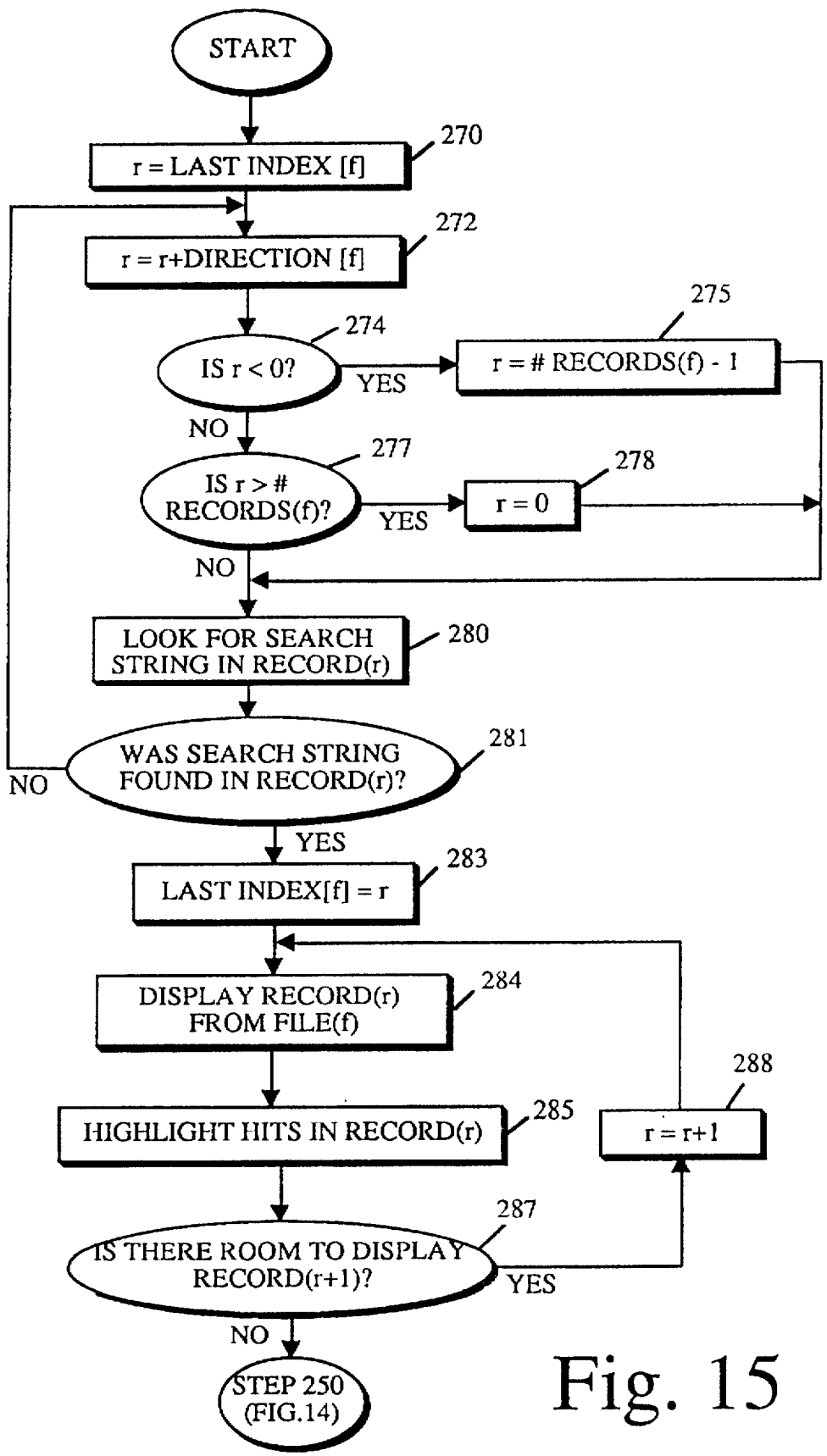
FIG. 15 is a flow diagram illustrating a method of scrolling the display of a local search.

Referring next to FIG. 15, the scrolling operation that occurs when either scroll button 54A or 54B is pressed will be described. As indicated above, when the selection of a scroll button is observed in either step 250 or step 253, the value "Direction[f]" is set in steps 251 or 254 respectively. The value "Direction[f]" is set to one (1) when the scroll down button 54B is selected and is set to negative one (−1) when the scroll up button 54A is selected. Then, in step 270, the value "r" is set to the value "last index[f]". Thereafter, in step 272, the value "r" is either incremented or decremented (depending upon the direction of the scroll arrow selected) by setting the value "r" equal to the old value "r" plus the value "Direction[f]", which is either plus or minus one (×1).

Thereafter, in step 274, the CPU 12 checks to determine whether the new value "r" is less than zero. If so, in step 275, the value of "r" is reset to the value "# Records in File" minus one. This covers the situation where the current record is the first record in the file and the user has hit the scroll up button 54A. Effectively, the record list wraps around to the last record in the current application file (f). If the value of "r" detected in step 274 is not less than zero, then in step 277 the CPU checks to determine whether the value "r" is greater than or equal to the value "# Record in File". If so, the value of "r" is reset to zero (0) in step 278. This covers the situation where the current record is the last record in the file and the user has selected the scroll down arrow 54B.

When the value "r" is not greater than or equal to the value "# Records in File" in step 277, or after the value "r" has been reset in either step 275 or step 278, then in step 280, a search is preformed to look for the search string in Record (r). Then in step 281 the CPU determines whether an occurrence of the search string was found. If the search string is not found, the logic returns to step 272 where the counter is again incremented or decremented. Therefore, a loop between steps 272 and 281 is formed and will be repeated until the next record having the search string therein is found.

Once an occurrence of the search string is detected in step 281, the value "Last Index [f]" is set to "r" in step 283. The record "r" in application file "f" is displayed in step 284 and the actual occurrence(s) of the search string in record "r" is (are) highlighted in step 285. Thereafter, in step 287, the CPU determines whether there is room to display another record. If so, the value "r" is incremented by one in step 288 and the logic returns to step 284 where it displays the next record. Thus, a loop is formed between steps 284 and 287 until the screen display is full. When the screen display is full, the logic returns to step 250 where it begins to look for the next user input. It is noted that when the full display mode is in use, each record is likely to occupy the full screen. Therefore, the first time the process comes to step 287 it would determine that there is not room to display the next record (r+1), therefore, it would immediately revert to step 250. On the other hand, when an overview display mode is in use, the first time the process comes to step 287 there will likely be room to display the next record and the process will loop back to step 284.

Although only one embodiment of the present invention with some variations has been described in detail herein, it should be understood that the present invention may be embodied in many other specific forms without departing from the spirit or scope of the invention. For example, the computer system, on which the described find and display task are executed may be varied widely. Similarly, the commands may be entered via keyboard entries, soft buttons on the screen, menu items, voice entry or any other input mechanism. Additionally, the contents, structure and/or formats of the stored application files and records, as well as the nature of the display formats may all be varied widely. Further, the algorithms described are exemplary in nature and may be widely varied within the scope of the invention. From the foregoing, it should be apparent that the present examples are to be considered as illustrative and not restrictive and the invention is not to be limited to the details given herein, but may be modified within the scope of the appended claims.

What is claimed is:

1. A method of controlling a display screen for searching the contents of a memory device associated with a pointer-based computer system and displaying the search results on the display screen associated with the computer system, the computer system having a processor and a plurality of applications, at least one of which is running on the processor, wherein the contents of the memory device include a plurality of searchable application files that are each associated with at least one of the plurality of applications and each capable of containing a plurality of records, the method comprising the steps of:

a) receiving a find command;

b) displaying a find dialog box on the display screen;

c) receiving a search string selection input by interaction of a pointer with the display screen, and displaying the search string in the find dialog box;

d) determining whether a global search mode or a local search mode has been selected by interaction of the pointer with the display screen;

e) executing the selected search, wherein,
      when the local search mode is selected, a search is made through the contents of each record in an application file that is associated with an application program that is currently running on the processor, and
      when the global search mode is selected, a search is made through each of the searchable applications and a list is made of the the application files searched and the number of records within each application file that contain the search string; and f) displaying at least a portion of the search results on the display screen.

2. A search and display method as recited in claim 1 wherein the pointer includes a stylus of a pen-based computer system.

3. A search and display method as recited in claim 2 wherein the search string is input by using the stylus to write the search string in the find dialog box.

4. A search and display method as recited in claim 2 wherein the search string is input by highlighting text on the display screen with the stylus before the find command is received.

5. A search and display method as recited in claim 1 wherein:
  a local search is the default search mode;
  a global icon is displayed in the find dialog box on the display; and
  a global search is selected by using the pointer to click on the global icon, wherein the global icon is highlighted when a global search mode is selected.

6. A search and display method as recited in claim 5 wherein the local search mode may be selected by clicking on the highlighted global icon.

7. A search and display method as recited in claim 1 wherein the computer system includes a keyboard having a find button thereon, wherein the find command is entered by actuating the find button.

8. A search and display method as recited in claim 7 wherein the search and display operation is dismissed by actuating the find button while the find dialog box is displayed on the screen.

9. A search and display method as recited in claim 1 wherein the search results displayed on the display screen after a global search include a summary indicating each of the application files in which an occurrence of the search string was found and an indication of the number of records within each such application file that include the search string.

10. A search and display method as recited in claim 9 wherein an indicator on the display screen that takes the form of a unique icon is displayed for each application file in which an occurrence of the search string was found.

11. A search and display method as recited in claim 10 further comprising a step of displaying an expanded summary of the records within a selected application file that contains the search string when a selected indicator associated with the selected application is clicked on with the pointer.

12. A search and display method as recited in claim 11 wherein the expanded summary includes a marker for each record within the associated application file, together with a brief summary of each record.

13. A search and display method as recited in claim 12 wherein when a particular marker is clicked on, the full text of the associated record will be displayed on the screen.

14. A search and display method as recited in claim 1 further comprising a step of checking to determine whether a scroll button has been selected and scrolling the display in response to an actuated scroll button when the search results suitable for display extend more than one page.

15. A search and display method as recited in claim 1 wherein when a local search is conducted, an indication of the total number of records within the current application file that contain the search string is displayed.

16. A search and display method as recited in claim 15 wherein the indication of the total number of records within the current application file that contain the search string is displayed within the find dialog box.

17. A search and display method as recited in claim 4 further comprising a step of checking to determine whether the global icon has been selected after a local search and wherein when the global icon is so selected, a global search is performed and the results of the global search are displayed.

18. A search and display method as recited in claim 1 wherein the find dialog box remains displayed until the find operation is dismissed.

19. A method of controlling a display screen for searching the contents of a memory device associated with a pointer-based computer system and displaying the search results on the display screen associated with the computer system, the computer system having a processor and a plurality of applications, at least one of which is running on the processor, wherein the contents of the memory device include a plurality of searchable application files that are each associated with one of the plurality of applications and each capable of containing a plurality of records, the method comprising the steps of:
  receiving a find command;
  receiving a search string selection input by interaction of a pointer with the display screen in the memory device;
  searching through the contents of each record in each of the searchable application files in the memory device and forming a list of each application files that contains a record that includes the search string and the number of records within each application file that contain the search string;
  displaying at least a portion of the search results wherein the displayed search results include a summary indicating each of the application files in which an occurrence of the search string was found and an indication of the number of records within each such application file that include the search string; and
  processing user inputs after the search results have been displayed.

20. A search and display method as recited in claim 19 wherein the pointer includes a stylus of a pen-based computer system, the method further comprising the step of displaying a find dialog box when the find command is received and wherein the search string may be entered by using the stylus to "write" the search string in the find dialog box.

21. A search and display method as recited in claim 20 wherein text that is highlighted when the find command is received is entered as the search string.

22. A search and display method as recited in claim 20 wherein:
  the computer system includes a keyboard having a find button thereon;
  the find command is entered by actuating the find button; and
  the search and display operation is dismissed by actuating the find button while the find dialog box is displayed on the screen.

23. A search and display method as recited in claim 19 wherein an indicator that takes the form of a unique icon is displayed for each application file in which an occurrence of the search string was found.

24. A search and display method as recited in claim 23 wherein when the user clicks on a particular indicator displayed in the global search results during the user input processing step, an expanded summary of the records within the associated application file that contains the search string is provided.

25. A search and display method as recited in claim 24 wherein the expanded summary includes a marker for each record within the associated application file, together with a brief summary of each record.

26. A search and display method as recited in claim 25 wherein when the user clicks on a particular marker during the user input processing step, the full text of the associated record will be displayed on the screen.

27. A search and display method as recited in claim 19 wherein the user input processing step includes the step of checking to determine whether the user has actuated a scroll button and scrolling the display in response to an actuated scroll button when the search results suitable for display extend more than one page.

28. A method of controlling a display screen for searching the contents of a memory device associated with a pointer-based computer system and displaying the search results on the display screen associated with the computer system, the computer system having a processor and a plurality of applications at least one of which is running on the processor, wherein the contents of the memory device include a plurality of searchable application files that are each associated with one of the plurality of applications and each capable of containing a plurality of records, the method comprising the steps of:

a) receiving a find command;

b) displaying a find dialog box on the display screen, the find dialog box including a global search icon;

c) receiving a search string selection input by interaction of a pointer with screen display and displaying the search string in the find dialog box;

(d) determining whether a global search mode or a local search mode has been selected by interaction of the pointer with the display screen wherein,
  when the global icon is highlighted, a global search mode is selected,
  when the global icon is not highlighted, a local search mode is selected, and
  the a global search mode may be selected by using the pointer to click on an unhighlighted global icon, and a local search mode may be selected by using the pointer to click on a highlighted global icon;
  conducting the desired search of the contents of each record of the applicable application file or files; and e) displaying at least a portion of the search results.

29. A search and display method as recited in claim 28 wherein when a local search is conducted, an indication of the total number of records within a current application file that contain the search string is displayed within the find dialog box.

30. A search and display method as recited in claim 29 wherein the find dialog box remains displayed until the find operation is dismissed.

31. A search and display method as recited in claim 28 wherein after a local search has been conducted the method further comprises the step of checking to determine whether the global icon and wherein when the global icon is so selected, a global search is performed and the results of the global search are displayed.

32. A pen-based computer system comprising:
processing means;
a memory means coupled to said processing means;
a display screen coupled to said processing means which detects the position of a stylus means;
a plurality of records organized in one or more files associated with one or more application programs and held in the memory means;
means for searching for a string in each of the plurality of records of said one or more files held in the memory means;
means for determining whether a global search mode or a local search mode has been selected by interaction of the pointer with the display screen, wherein
  when the local search mode is selected, the means for searching searches the contents of each record in one of the files, and
  when the global search mode is selected, the means for searching searches the contents of each record in each of the one or more files held in the memory means; and
a plurality of indicator icons, each having a corresponding file and each displayed adjacent a display of the number of hits in the corresponding file found by the means for searching.

33. The pen-based computer system of claim 32 further comprising a find button which causes the computer system to display a find dialog box on the display screen, the find dialog box providing a region of the display screen for entering a string with the stylus.

34. The pen-based computer system of claim 33 wherein the find dialog box includes a global icon which, when selected by interaction of the stylus with the display screen, causes the computer system to enter the global search mode.

35. The pen-based computer system of claim 32 wherein the one or more files held in the memory means are each associated with a corresponding application which can run on said processing means.

* * * * *

UNITED STATES PATENT AND TRADEMARK OFFICE
CERTIFICATE OF CORRECTION

PATENT NO. : 5,764,818

DATED : June 9, 1998

INVENTOR(S) : Stephen P. Capps, et al.

It is certified that error appears in the above-identified patent and that said Letters Patent is hereby corrected as shown below:

In the claims:

Claim 1, column 16, line 62, please insert after the word through, - -the contents of each record in - -.

Signed and Sealed this

Nineteenth Day of January, 1999

Attest:

Attesting Officer

*Acting Commissioner of Patents and Trademarks*